Patented Sept. 7, 1937

2,092,075

UNITED STATES PATENT OFFICE 2,092,075

MONOAZO DYESTUFFS AND THEIR PRODUCTION

Arthur Howard Knight, Blackley, Manchester, England, assignor to Imperial Chemical Industries Limited, a corporation of Great Britain No Drawing. Application November 30, 1934, Serial No. 755,506. In Great Britain December 8, 1933

11 Claims. (Cl. 260—96)

In U. S. Patent No. 1,483,084 there is described the manufacture of azo dyestuffs which dye wool and silk from an acid bath and which owe their solubility and acid character to the presence in their structure of the alcoholic sulphuric acid group —$C_2H_4SO_4H$ attached to nitrogen. Dyes containing this —$C_2H_4SO_4H$ group (including soluble salts thereof) have been called "sulphato" dyes.

In British specification No. 237,739 there is described a process of dyeing acetate artificial silk by applying certain sulphato monoazo dyes, and in particular sulphato nitrated monoazo dyes, in a neutral, acid or alkaline dyebath.

According to the present invention we apply new sulphato dyes, namely 2,4-dinitro-benzene or -α-naphthaleneazo-p-N-butylsulphatoalkylanilines in the coloring of acetate artificial silk, silk, tin-weighted silk, wool and leather.

Also according to the invention we manufacture the new monoazo dyestuffs by combining a diazotized 2,4-dinitroaniline or diazotized 2,4-dinitro-α-naphthylamine with an N-butylsulphatoalkyl derivative of an amine of the benzene series adapted to couple in the para-position to the amino group.

We exclude however from this invention the dyes from 6-chloro-2,4-dinitroaniline and 6-bromo-2,4-dinitroaniline as dyestuffs from these compounds are the subject of copending application Serial No. 755,511.

We find that the introduction of the butyl group attached to the nitrogen of the coupling component carrying the sulphato-alkyl group gives bluer shades than those given by corresponding known dyestuffs having the ethyl group attached to the nitrogen of the coupling component carrying the sulphato-alkyl group.

The new dyestuffs are soluble in water and dye acetate artificial silk from an acid, neutral or alkaline dyebath in reddish-violet to bluish-violet shades, of good fastness properties and good dischargeability. They are also eminently suitable for the direct printing of acetate artificial silk. Also when applied from an acid bath they dye wool, natural silk and tin-weighted silk in reddish-violet to bluish-violet shades. They are also suitable for the dyeing of leather when applied in the usual way for acid dyestuffs.

Suitable diazo components are those from 2,4-dinitroaniline, 6-methyl-2,4-dinitroaniline, 6-methoxy-2,4-dinitroaniline, 2,4-dinitro-α-naphthylamine.

The invention is illustrated but not limited by the following examples in which the parts are by weight.

Example 1

69 parts of sodium nitrite are added during half an hour with stirring to 1480 parts of 100% sulphuric acid. After continuing stirring until no solid matter remains, 201.3 parts of 2,4-dinitroaniline (10% excess of theory) are gradually added with stirring during 2 hours. The mixture is stirred for a further period until all solid matter has disappeared and the sulphuric acid solution so obtained is then poured into 4000 parts of ice and 1000 parts of water with good agitation. The excess base which separates out is filtered off from the diazo solution. The diazo solution is then added slowly to a well-agitated solution containing 295 parts of the sodium salt of N-n-butylsulphatoethylaniline in 4000 parts of water at 0°–5° C.

During coupling 40% aqueous caustic soda is added gradually at such a rate that the coupling medium is kept slightly acid to Congo red paper, and ice is added from time to time to keep the temperature of the coupling medium at 0°–5° C. When coupling is complete the dyestuff suspension is rendered slightly alkaline with aqueous caustic soda and the dyestuff filtered off. The dyestuff paste is resuspended in 12000 parts of water to dissolve the sodium sulphate adhering to it, the dyestuff filtered off and preserved as paste or dried in any suitable way.

When applied from a neutral bath containing 3% salt the dyestuff produces on acetate artificial silk reddish-violet shades of good fastness properties and dischargeability. It can also be used for the direct printing of acetate artificial silk.

When applied from an acid dyebath the dyestuff dyes wool, natural silk, and tin-weighted silk.

An aqueous solution of the sodium salt of N-n-butylsulphatoethylaniline is obtained by reacting N-β-hydroxyethylaniline with n-butylbromide to give N-n-butyl-β-hydroxyethylaniline, and then reacting one molecular proportion of N-n-butyl-β-hydroxyethylaniline dissolved in tetrachloroethane with one molecular proportion of chlorosulphonic acid, removing the solvent, dissolving the crude sulphato compound remaining in dilute aqueous caustic soda and extracting this aqueous solution of the sodium salt of N-n-butylsulphatoethylaniline with ether to remove any unchanged N-n-butyl-β-hydroxyethylaniline.

Example 2

The solution of diazotized 2,4-dinitroaniline obtained as described in Example 1 is added slowly to a well-stirred solution containing 309 parts of the sodium salt of N-n-butylsulphatoethyl-m-toluidine in 4000 parts of water at 0°-5° C. During coupling 40% aqueous caustic soda is added gradually at such a rate that the coupling medium is kept slightly mineral acid to Congo red paper, and ice is added from time to time to keep the temperature of the coupling medium at 0°-5° C. When coupling is complete the dyestuff suspension is rendered slightly alkaline, the dyestuff filtered off, washed with water, and the dyestuff paste so obtained preserved as such or dried in any suitable way. The dyestuff is soluble in water and it dyes cellulose artificial silk in violet shades of good dischargeability when applied from an acid bath or from a neutral bath containing 3% salt. It is also suitable for the direct printing of cellulose artificial silk.

An aqueous solution of the sodium salt of N-n-butylsulphatoethyl-m-toluidine is obtained by reacting N-β-hydroxyethyl-m-toluidine with n-butyl chloride to give N-n-butyl-β-hydroxyethyl-m-toluidine and then reacting one molecular proportion of N-n-β-hydroxyethyl-m-toluidine dissolved in tetrachloroethane with one molecular proportion of chlorosulphonic acid, removing the solvent by distillation, dissolving the residue of the crude sulphato compound in dilute aqueous caustic soda, and extracting the aqueous solution of the sodium salt of N-n-butylsulphatoethyl-m-toluidine with ether to remove any unchanged N-n-butyl-β-hydroxyethyl-m-toluidine.

Example 3

69 parts of sodium nitrite are added to 1480 parts of 100% sulphuric acid during half an hour with stirring, and stirring continued until all solid matter has disappeared. To the solution so obtained are then added during 2 hours and with stirring 239 parts of 2,4-dinitro-α-naphthylamine. Stirring is continued until no solid matter remains. The sulphuric acid solution is then heated to 40° C. and 50° C. and kept at that temperature for two hours, then cooled to 20° C. and added gradually to a solution containing 295 parts of the sodium salt of N-butylsulphatoethylaniline in 4000 parts of water at 0°-5° C.

Coupling is effected as described in Example 1. When coupling is complete the dyestuff suspension is rendered slightly alkaline with aqueous caustic soda and the dyestuff filtered off, washed with water, and preserved as paste or dried in any suitable way. It dyes acetate artificial silk in violet shades when applied from an acid dyebath, or from a neutral dyebath containing 3% salt.

It possesses good affinity for leather which it dyes in violet shades when applied in the usual manner for acid dyestuffs.

I claim:

1. The compound represented by the formula

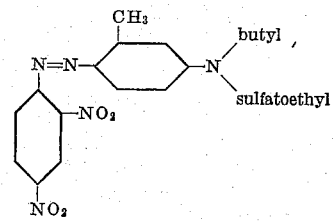

2. The compound represented by the formula

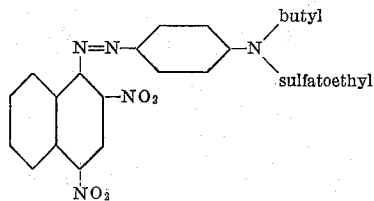

3. The compound represented by the formula

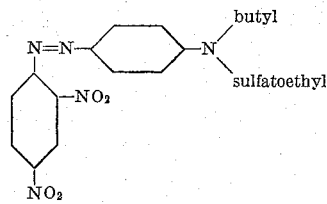

4. The compound represented by the formula

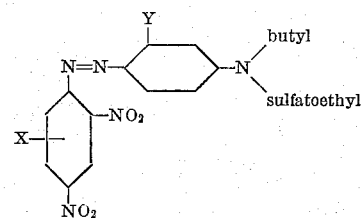

in which X is one of a group consisting of hydrogen, methyl, and methoxy, and Y is one of a group consisting of hydrogen and methyl.

5. A compound being identical with the product formed by coupling a diazotized 2,4-dinitroarylamine, wherein aryl is a member selected from the group consisting of the radicals of the benzene and naphthalene series, with a compound represented by the formula

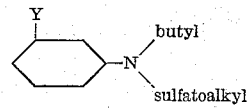

in which Y is one of a group consisting of hydrogen and methyl, coupling occurring in a position para to the amino substituent.

6. The process of preparing an azo dyestuff which comprises diazotizing 2,4-dinitroaniline, adding it slowly to a well-stirred aqueous solution containing the sodium salt of N-butyl-N-sulfatoethyl-m-toluidine at 0° to 5° C., adding 40% aqueous caustic soda solution at such a rate that the bath is kept slightly acid to Congo red paper, maintaining the temperature at 0° to 5° C., filtering, washing, and drying.

7. The process of making an azo dyestuff which comprises diazotizing 2,4-dinitronaphthylamine and coupling it to a compound represented by the formula

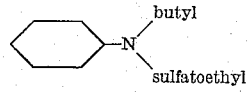

in a position para to the amino group.

8. The method of preparing an azo dyestuff which comprises diazotizing 2,4-dinitroaniline and coupling it to a compound having the formula

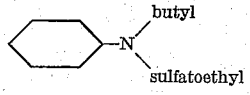

9. The process of making an azo dyestuff which comprises diazotizing a compound represented by the formula

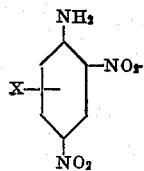

in which X is one of a group consisting of hydrogen, methyl, and methoxy, and coupling it to a compound represented by the formula

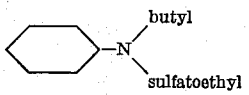

10. The process of making an azo dyestuff which comprises diazotizing a compound having the formula

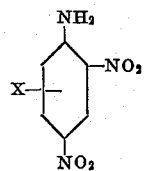

in which X is one of a group consisting of hydrogen, methyl, and methoxy, and coupling it to a compound represented by the formula

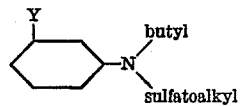

in which Y is one of a group consisting of hydrogen and alkyl.

11. The process which comprises diazotizing a 2,4-dinitro-arylamine, wherein aryl is a member selected from the group consisting of the radicals of the benzene and naphthalene series, and coupling it to a compound represented by the formula:

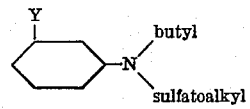

in which Y is one of a group consisting of hydrogen and methyl.

ARTHUR HOWARD KNIGHT.